July 29, 1924.
H. M. LOVELACE
STEERING GEAR
Filed Nov. 16, 1922
1,502,731
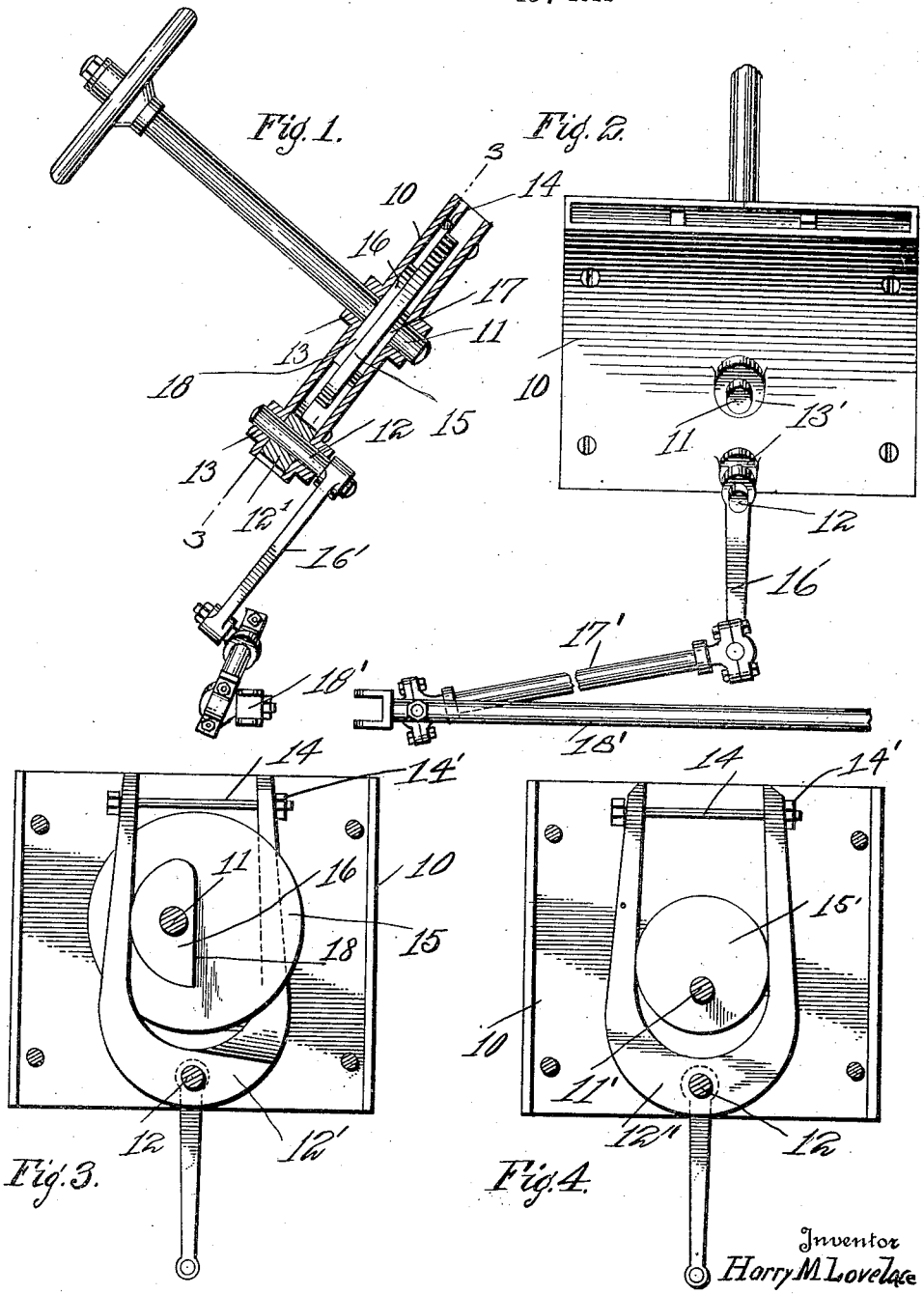

Patented July 29, 1924.

1,502,731

UNITED STATES PATENT OFFICE.

HARRY M. LOVELACE, OF VALLEJO, CALIFORNIA.

STEERING GEAR.

Application filed November 16, 1922. Serial No. 601,316.

*To all whom it may concern:*

Be it known that I, HARRY M. LOVELACE, a citizen of the United States, residing at Vallejo, in the county of Solano, State of California, have invented certain new and useful Improvements in Steering Gears; and I do hereby declare the following to be a full, clear, and exact description of the invention, such as will enable others skilled in the art to which it appertains to make and use the same.

This invention relates to new and useful improvements in steering gear, and particularly to steering gear for automobiles.

One object of the invention is to provide a steering gear which is simple in construction, positive in its operation, and which obviates the use of gear wheels.

Another object is to provide a steering gear wherein there is no lost motion.

Other objects and advantages will be apparent from the following description when taken in connection with the accompanying drawing.

In the drawing:

Figure 1 is a side elevation of a steering gear made in accordance with the invention, the casing being in section.

Figure 2 is a front elevation of the same.

Figure 3 is a sectional view, on the line 3—3 of Figure 1.

Figure 4 is a view similar to Figure 3, showing a modification of the device wherein the operating disk is eccentrically mounted on the steering column and engages its peripheral face with the arms of the yoke.

Referring particularly to the accompanying drawing, 10 represents a frame or housing, and disposed through the housing are the shafts 11 and 12, the same being supported by the bearings 13. The former shaft, 11, constitutes the steering column of the steering gear, and is in parallel relation to the shaft 12. Secured to the shaft 12, and extending horizontally therefrom is a yoke 12', a bolt 14 being disposed through the outer ends of the arms thereof for the purpose of flexing said arms toward and away from each other. Secured on the steering column 11, and disposed within the yoke is a disk 15.

Fixed on the opposite faces of the disk 15 are the cam bosses 16 and 17, the straight edges 18 of which are disposed at approximately right angles to each other. It will be particularly noted that the arms of the yoke are offset with respect to each other, into different planes, and by such arrangement the cam bosses engage their peripheral faces with the inner faces of the said arms respectively. The disk thus rotates between the planes of the arms of the yoke, so that the cam bosses will rock the yoke first in one direction and then in the other, to operate the steering rod of the automobile. To take up any play between the cam disk and the arms of the yoke, or to relieve any undue friction therebetween, the bolt 14 is properly adjusted by means of the nut 14', to draw the arms of the yoke together, or to permit said arms to spring away from each other.

On the forward end of the shaft 12 there is secured a depending crank arm 16', and pivotally connected to the lower end of this arm is the link 17', which is properly connected to the tie rod 18'.

In Figure 4 there is shown a modification of the mechanism wherein the disk 15' is eccentrically mounted on the shaft 11', and is so arranged between the arms of the yoke 12" that its peripheral face is constantly in contact with the inner faces of the arms. Otherwise the construction of the modification is the same as that of the preferred form shown in the other figures of the drawing. It will be noted that the upper and lower faces of the edge portion of the disk contact with the lower face of one arm and the upper face of the other arm of the yoke, respectively, whereby to maintain the yoke against vertical movement.

Thus when the steering column is turned, the cam bosses of the disk 15 will engage with the arms of the yoke and cause a rocking movement of the shaft 12, with the result that the tie rod 18 will be shifted and the front wheels of the automobile steered.

It will be noted that with this construction the motion is even and positive, and without any jar. Furthermore, no lost motion is present in the connections, as the contact of the cam bosses of the disk and the arms of the yoke is properly maintained by the adusting bolt 14.

What is claimed is:

1. A steering gear including a driving shaft, a driven shaft, a yoke fixed on the driven shaft and having its arms offset in parallel planes, a disk carried by the drive shaft and rotatable in a plane between the planes of the arms, and means on the disk engaging the arms for rocking movement of the yoke.

2. A steering gear including a drive shaft and a driven shaft, a yoke carried by the driven shaft and having parallel arms disposed in offset relation into parallel planes, a disk on the drive shaft rotatable in a plane between the planes of the arms, and cam means on the disk engaged with the inner faces of the arms.

3. A steering gear including a drive shaft and a driven shaft, a yoke carried by the driven shaft and having parallel arms offset in the direction of the thick of the body of the yoke into parallel planes, a disk carried by the drive shaft and rotatable in a plane between and parallel with the planes of the arms, and cam bosses on the opposite faces of the disk engaging with the inner faces of the arms of the yoke.

4. A steering gear including a driving shaft, a driven shaft, a yoke fixed on the driven shaft and having its arms offset in parallel planes above and below the plane of the yoke, a disk carried by the drive shaft and rotatable in the plane of the yoke, and means on the disk operating in the planes of the arms and engaging the arms for rocking movement of the yoke.

In testimony whereof, I affix my signature, in the presence of two witnesses.

HARRY M. LOVELACE.

Witnesses:
 ALBERT HUFFMAN,
 PEARL HUFFMAN.